United States Patent [19]

Gryctko et al.

[11] 4,085,622

[45] Apr. 25, 1978

[54] ELECTRICAL OPERATOR FOR CIRCUIT BREAKERS

[75] Inventors: Carl E. Gryctko, Haddon Heights, N.J.; Anthony B. Michetti, Warminster; Peter J. McGinnis, Chester Township, Delaware County both of Pa.

[73] Assignee: I-T-E Imperial Corporation, Spring House, Pa.

[21] Appl. No.: 421,536

[22] Filed: Dec. 4, 1973

[51] Int. Cl.$^2$ .............................................. F16H 25/08

[52] U.S. Cl. ........................................................ 74/53

[58] Field of Search ...................... 74/53, 99; 335/189, 335/68; 200/11 TC, 17 R, 153 SC; 192/56 R

[56] References Cited

U.S. PATENT DOCUMENTS

| | | | |
|---|---|---|---|
| 2,102,062 | 12/1937 | Hill | 192/56 R |
| 2,313,708 | 3/1943 | Waller | 192/56 |
| 3,244,096 | 4/1966 | Riley | 192/56 |
| 3,432,780 | 3/1969 | Evans et al. | 335/68 |
| 3,646,822 | 3/1972 | Pocaterra | 74/53 |
| 3,752,947 | 8/1973 | Strobel | 74/99 |

*Primary Examiner*—Benjamin W. Wyche
*Assistant Examiner*—Wesley S. Ratliff, Jr.
*Attorney, Agent, or Firm*—Ostrolenk, Faber, Gerb & Soffen

[57] ABSTRACT

An electric motor for driving a circuit breaker operating handle is connected to the latter by two sets of linkages. The first set of linkages includes a drive arm and a driven arm mounted on fixed spaced centers and interconnected by a cam means. The drive arm is pivoted by connection to the drive motor through gearing and a slip clutch, and mounts a roller entered into a cam slot formed in the driven arm. The second set of linkages consists of a drive link and a main link also mounted on fixed spaced centers with the main link having means for engaging and moving a circuit breaker operating handle. The drive and main links are connected by a roller-slot arrangement, with the roller being positively guided along an arcuate path formed about a center remote from the centers of the links and arms. Positive guidance of this connecting roller causes the effective lengths of the links to change in accordance with different positions of the circuit breaker handle. The centers of the driven arm and drive link coincide so that movement of the driven arm causes corresponding movement of the drive link. The combination of cam connected drive and driven arms together with a positively guided roller to change the effective lengths of drive and main links enables a relatively small electric motor to rapidly operate a very large circuit breaker.

9 Claims, 8 Drawing Figures

ELECTRICAL OPERATOR FOR CIRCUIT BREAKERS

This invention relates to motor operated circuit breakers in general and more particularly relates to a motor operator having means to control applied forces to generally match the varying forces required for operation of a circuit breaker handle.

In U.S. Pat. No. 3,752,947, issued Aug. 14, 1973, to A. Strobel for an Auxiliary Mechanism For Operating Handle Of Circuit Breaker, there is disclosed a pair of links interconnected by a roller that is positively guided in an arcuate slot which is so proportioned and positioned that the effective relative lengths of the links vary for different angular positions thereof with the result that the forces available for operating the circuit breaker generally increase and decrease as the forces required for contact operation increase and decrease.

Even though this auxiliary mechanism has proven satisfactory for manual operation of relatively large capacity circuit breakers, using this type of mechanism with a motor operator requires a motor of excessive size. Thus, in accordance with teachings of the instant invention, a drive and driven arm connected by a cam means are provided for interconnection of a motor operator to an auxiliary mechanism connected to operate a circuit breaker operating handle. A suitable motor operator is disclosed in U.S. Pat. No. 3,601,562, issued Aug. 24, 1971, to C. E. Gryctko for a Defeater Lock For Electrically Operated Circuit Breaker, and the auxiliary mechanism is of a type disclosed in the aforesaid U.S. Pat. No. 3,752,947. The combination of an interconnecting roller guided in an arcuate slot and a cam means interconnecting drive and driven arms results in a relatively small motor being sufficient for fast operation of a circuit breaker operating handle.

Accordingly, a primary object of the instant invention is to provide a relatively inexpensive compact motor operator for a relatively large molded case circuit breaker.

Another object is to provide a motor operator of this type utilizing cam means to interconnect linkages in such a manner that the force applied to the circuit breaker handle for each position thereof generally follows the force required to move the handle at each particular position thereof.

Still another object is to provide a motor operator of this type which utilizes a guided connecting element between a pair of links to control the relative effective lengths of both links for different angular positions thereof.

These objects as well as other objects of this invention will become readily apparent after reading the following description of the accompanying drawings in which.

Figure 1:
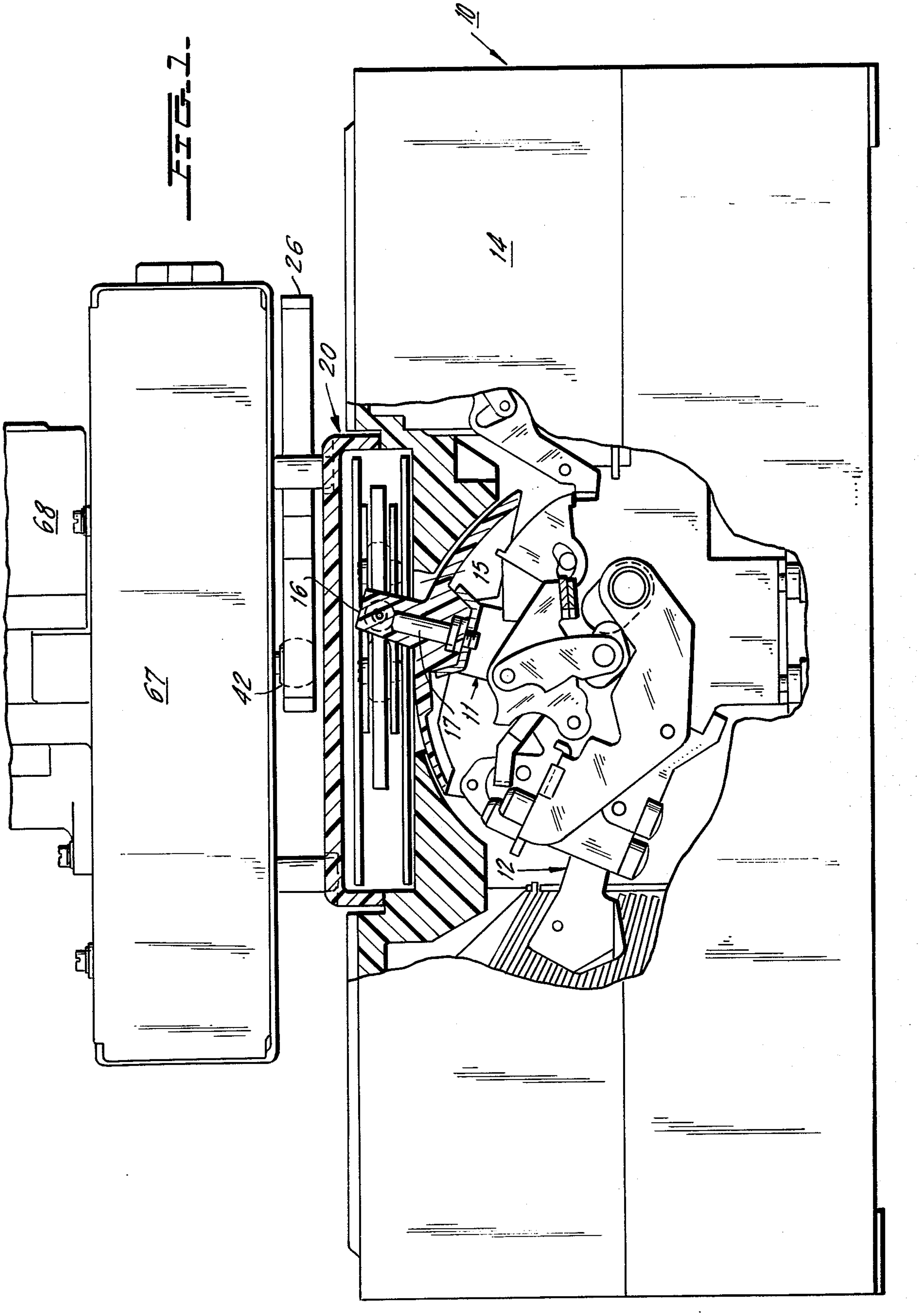
FIG. 1 is a side elevation of a circuit breaker, partially sectioned, having a motor operator constructed in accordance with the instant invention mounted thereto.
Figure 2:
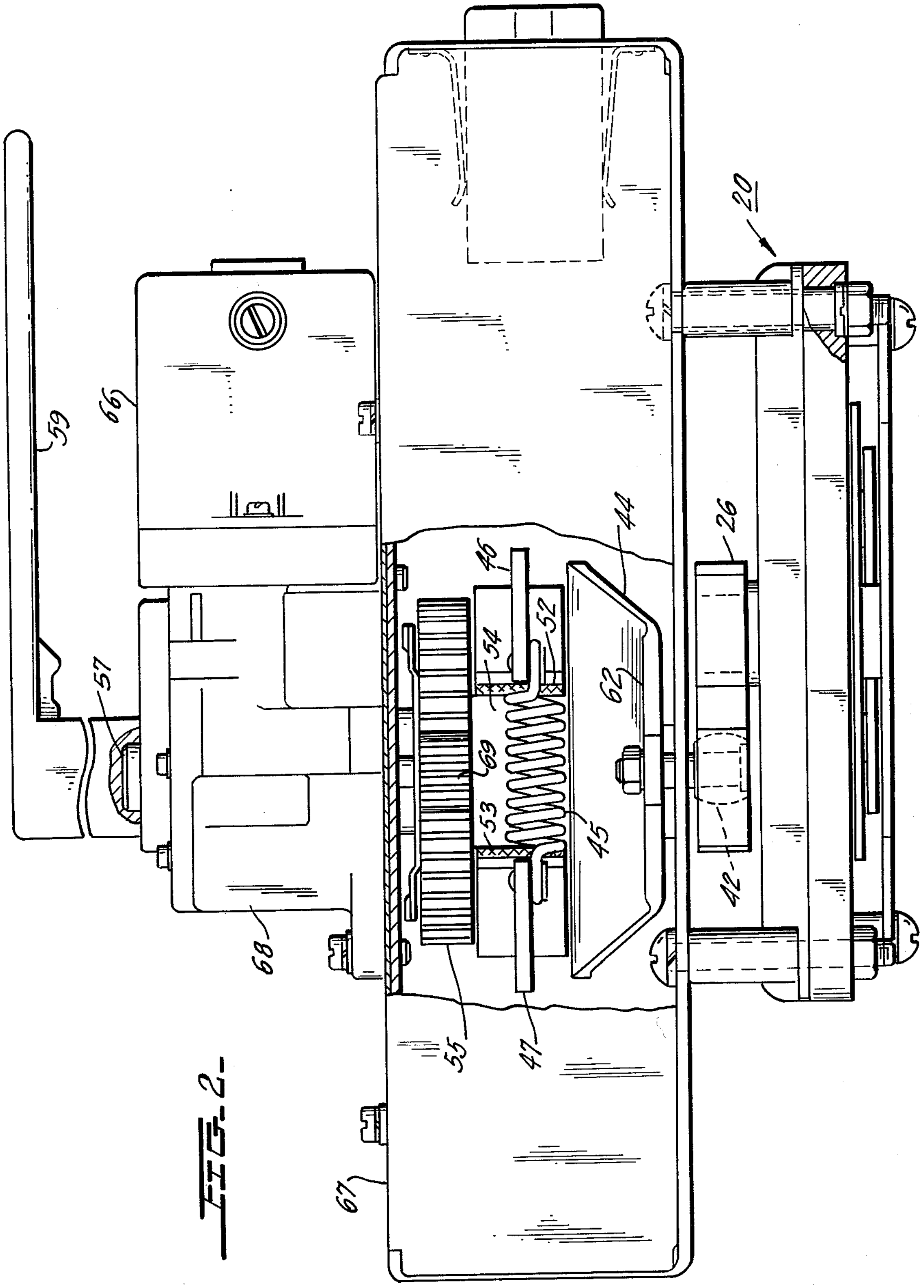
FIG. 2 is an enlarged side elevation of the motor operator and auxiliary handle mechanism looking in the direction of arrows 2—2 of FIG. 3.
Figure 3:
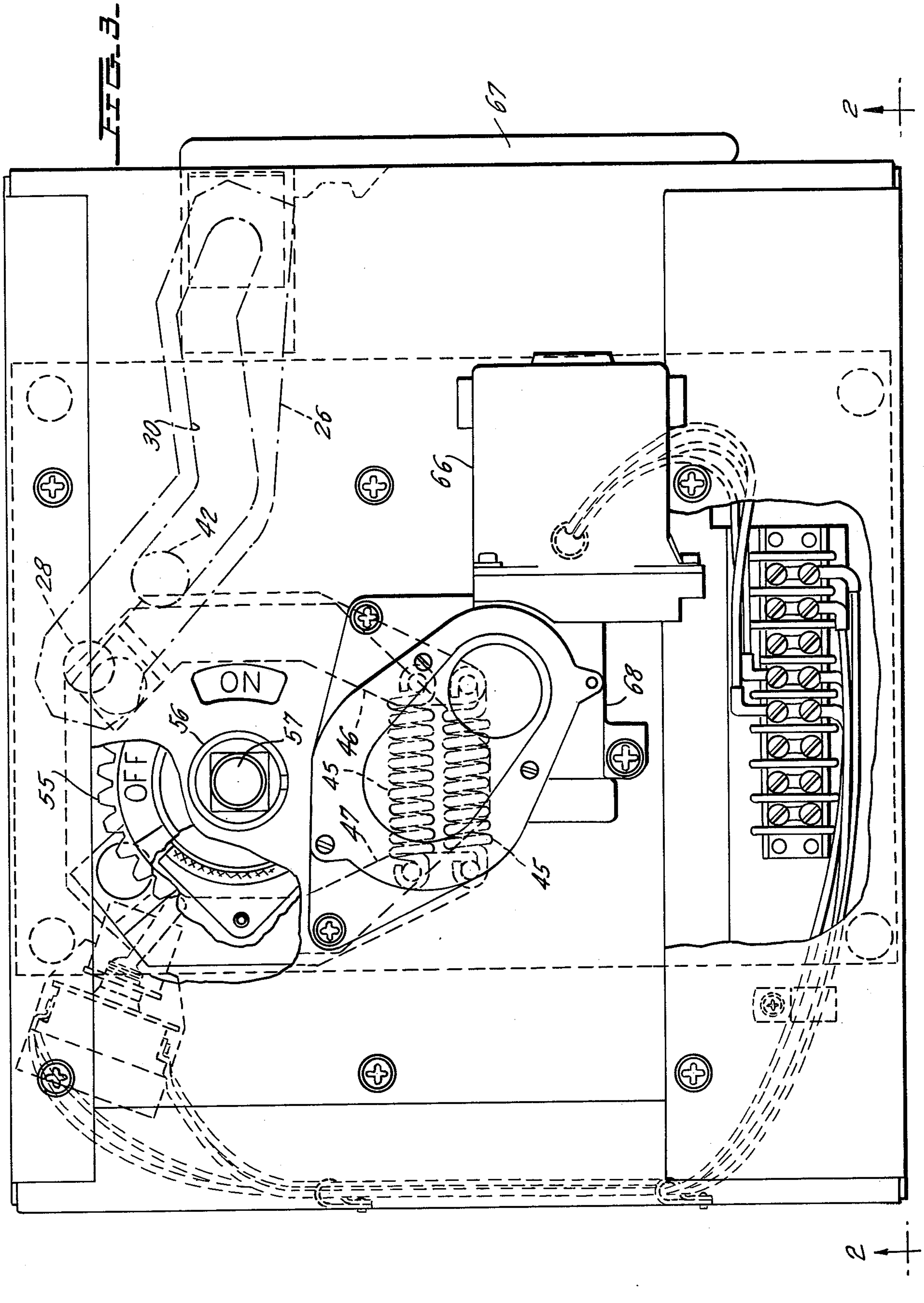
FIG. 3 is a plan view of the motor operator with the optional manual operating handle removed.
Figure 4:
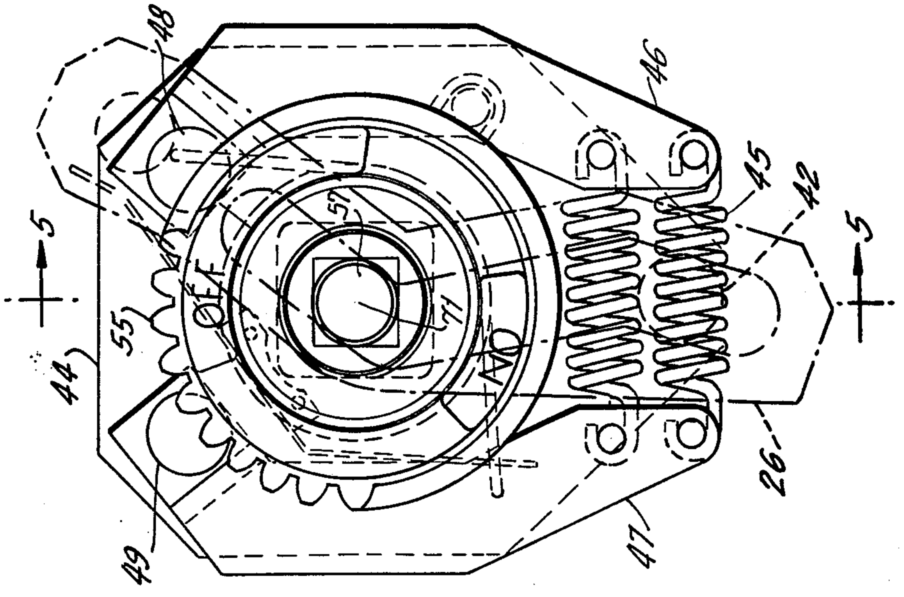
FIG. 4 is a plan view of the motor operator main gear and elements driven thereby.

Now referring to the figures Molded case circuit breaker 10 is a three-pole unit of exceptionally high continuous rating, say in excess of 2,000 amperes. This type of circuit breaker 10 is described more fully in U. S. Pat. No. 3,770,922, issued Nov. 6, 1973, to C. E. Gryctko for a Circuit Breaker Contact Structure. In particular, circuit breaker 10 includes spring powered overcenter toggle-type operating mechanism 11 for opening and closing circuit breaker 10 by operating movable contact structure 12. The upper surface of circuit breaker housing 14 is provided with opening 15 through which stubby handle 16 extends. Handle 16 is connected by pin means 17 to contact operating mechanism 11 for operation of the latter. In a manner well known to the art, movement of handle 16 is directed along an arcuate path in a plane perpendicular to the upper surface of housing 14.

Figure 7:
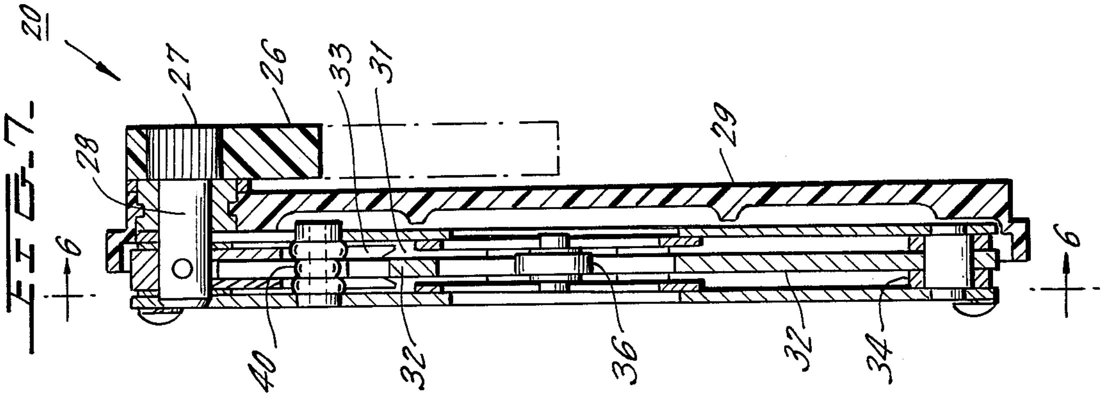
FIG. 7 is a cross-section taken through line 7—7 of FIG. 6, looking in the direction of arrows 7—7.
Figure 6:
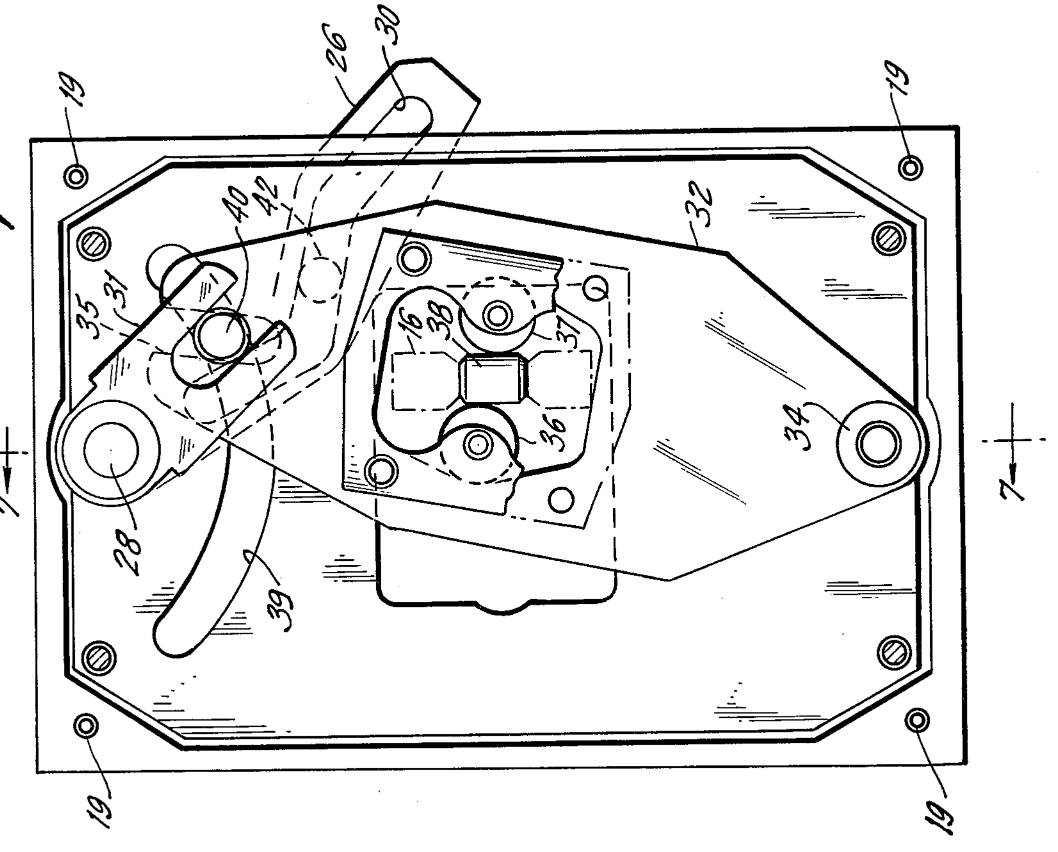
FIG. 6 is a bottom view of the auxiliary handle mechanism looking in the direction of arrows 6—6 of FIG. 7.

Auxiliary handle mechanism 20, illustrated in greater detail in FIGS. 6 and 7, is secured to the upper surface of housing 14 by four screws 19. Auxiliary handle mechanism 20 is essentially the same as mechanism 250 described in U.S. Pat. No. 3,752,947, issued Aug. 14, 1973, to A. Strobel, for an Auxiliary Mechanism For Operating Handle of Circuit Breaker. The difference between mechanism 20 of the instant application, and mechanism 250 of the aforesaid U.S. Pat. No. 3,752,947 is that the long manual operating handle 253 of mechanism 250 is replaced by driven arm 26 fixedly secured at one end thereof to the portion 27 of main shaft or output element 28 that extends above shallow housing 29 of mechanism 20. For a reason to be hereinafter explained, driven arm 26 is provided with elongated cam slot 30.

Disposed within housing 29 is a linkage comprised of drive link 31 connected to main link 32 by roller 40. One end of link 31 is keyed to main shaft 28 and the other end of link 31 is provided with longitudinally extending slot 33. One end of link 32 is mounted to stationary pivot 34, and the other end is provided with longitudinally extending slot 35. The mid-region of main link 32 is provided with spaced rollers 36, 37 disposed on opposite sides of roller 38 that is pivotally mounted to stub handle 16, so that as main link 32 moves in a plane parallel to the upper surface of circuit breaker housing 14 rollers 36, 37 engage roller 38 to move handle 16 and thereby operate mechanism 11 to open and close circuit breaker 10. Roller 40 interconnects links 31, 32 by extending into slots 33, 35, with the path of movement for roller 40 being dictated by arcuate guide slot 39 formed about a center (not shown) remote from link centers 28, 34. Thus, as main shaft 28 is pivoted to move drive link 31 roller 40 transmits motion of drive link 31 to main link 32. For different angular positions of drive link 31, connecting roller 40 assumes a different relationship ith respect to pivots 28, 34, thereby changing the effective lengths of links 31, 32 to change the mechanical advantages obtained through the cooperation of links 31, 32.

Motor 66 acts through a slip clutch (to be hereinafter described) and a linkage comprised of arm 26 connected to arm 44 by roller 42 to drive main shaft 28. More particularly, drive roller 42 is secured to offset portion 62 of drive arm 44 near the free end thereof and is entered into cam slot 30 of driven arm 26. The section of drive arm 44 remote from portion 62 acts as a support plate pivotally mounting spaced arm 46, 47 at the respective centers 48, 49. The ends of arms 46, 47 remote from centers 48, 49 are interconnected by coiled tension springs 45 which provide a biasing force for actuating the slip clutch consisting of shoes 52, 53 covered with friction material engaging the outer surface of drum 54. The latter is interposed between arms 46, 47 and main gear 55.

Gear 55 is mounted for rotation about longitudinally depressible tube 56 as a center. Tube 56 surrounds shaft 57 and is longitudinally fixed with respect thereto by pin 58. Manual operating handle 59 is keyed to the upper end of shaft 57 whose lower end is provided with retaining ring 61, positioned below arm 44. Coil spring 63, surrounding shaft 57 near the lower end thereof, acts through coupling member 64 to bias tube 56 and shaft 57 upward. The outer surface coupling member 64 is a polyagonal, in this case a square, corresponding to the interior shape of drum bore 64 wherein spring 63 is disposed. Normally, spring 63 biases coupling member 64 upward into the closely fitted square portion 65 of the central bore through main gear 55. Reversible electric motor 66 mounted to the exterior of housing 67 drives transmission or speed reducer 68. The output shaft of speed reducer 68 drives spur gear 69 in mesh with main gear 55 to drive the latter.

Figure 5:
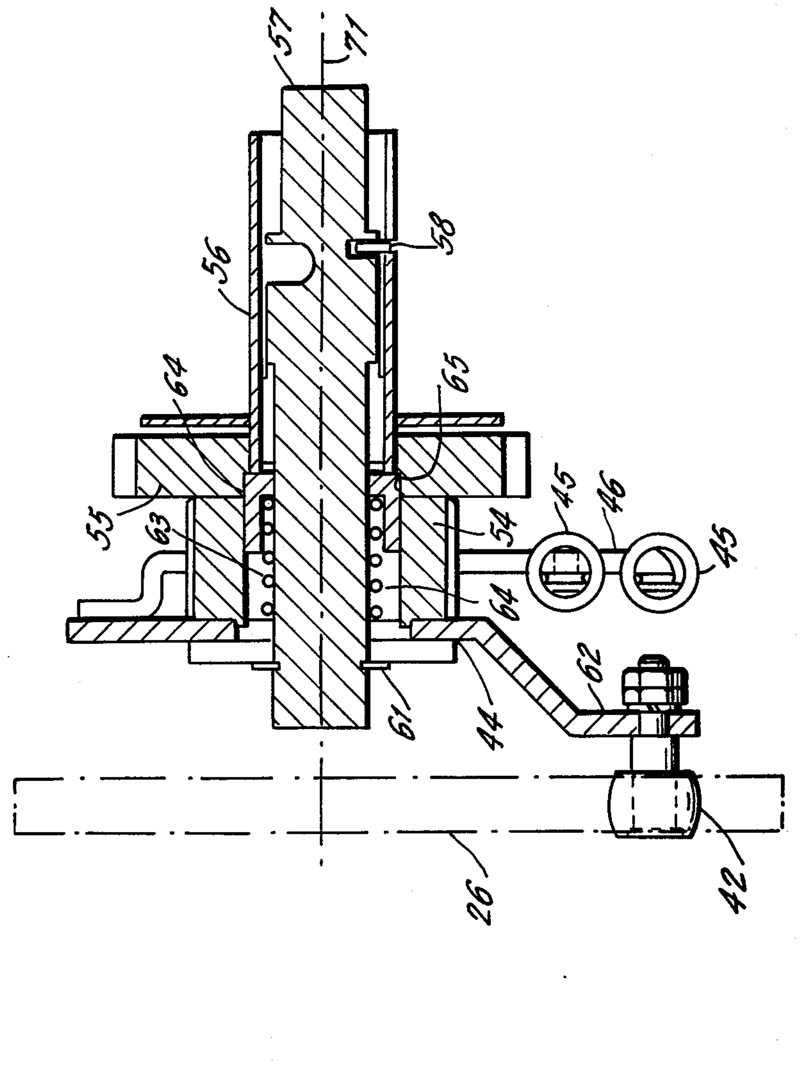
FIG. 5 is a cross-section taken through line 5—5 of FIG. 4, looking in the direction of arrows 5—5.
Figure 8:
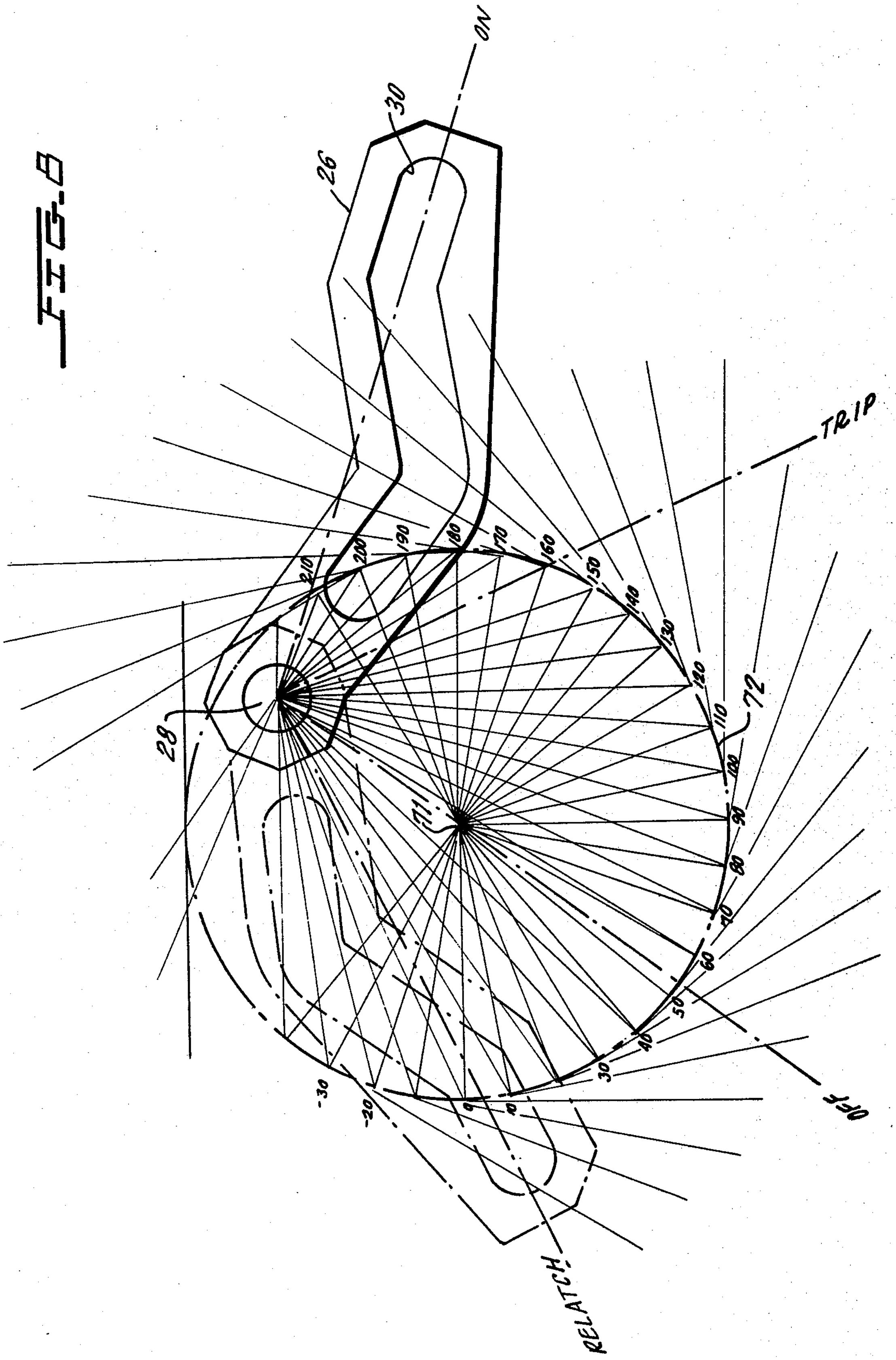
FIG. 8 is a developmental sketch showing the relationships between the drive arm and driven arm for various positions of the circuit breaker handle.

For power operation of circuit breaker 10, motor 66 is electrically energized to rotate main gear 55 in the proper direction. Rotation of gear 55 is transmitted by coupling 64, in its active position of FIG. 5, to rotate drum 54. The frictional engagement between drum 54 and shoes 52, 53 on arms 46, 47 couples drive arm member 44 to drum 54 for rotation therewith about longitudinal center 71 of shaft 57. This movement of arm 44 moves drive roller 42 along arcuate path 72 (FIG. 8). Since roller 42 rides in cam slot 30, movement of drive arm 44 pivots driven arm 26 to drive main shaft 28.

With reference to FIG. 8, it is seen that with circuit breaker 10 in its OFF position, cam or drive roller 42 is at the point of cam slot 30 closest to main shaft 28. This is the point of lowest mechanical advantage and this is the point where minimum force is required to move handle 16 for opening of circuit breaker 10. As roller 42 moves clockwise along path 72 toward the OFF position, roller 42 moves away from main shaft 28 and the mechanical advantage afforded by the coupling between drive arm 44 and driven arm 26 increases until it is maximum at a position corresponding substantially at the overcenter position of the toggle for operating mechanism 11. As roller 42 continues clockwise along path 72, the force requirements are reduced. As a consequence, the mechanical advantage obtained through the cooperation of arms 26, 44 is decreased by moving roller 42 closer to main shaft 28.

It should now be apparent to those skilled in the art that cam slot 30 is custom-made so that for any angular position of drive arm 44 the mechanical advantage obtained through the utilization of the linkage consisting of arms 26, 44 will vary in accordance with the force requirements necessary to pivot drive shaft 28.

Although there have been described preferred embodiments of this novel invention, many variations and modifications will now become apparent to those skilled in the art. Therefore, this invention is to be limited not by the specific disclosure herein but only by the appending claims.

The embodiments of the invention in which an exclusive privilege or property is claimed are defined as follows:

1. A device for operating an electrical switch, said device including a power operated driving means, a main output element operatively connectable to a circuit breaker handle for moving same; and linkage means, including a cam means, interconnecting said driving means to said output element to obtain a mechanical advantage at said output element that varies for different positions thereof generally in relation to force required to operate said output element at each of said different positions; said linkage means including first and second arms extending between said driving means and said output element; said cam means providing a driving connection between said arms; said cam means including means defining a longitudinally extending cam formation on said second arm and follower means at a fixed location on said first arm in operative engagement with said cam formation.

2. A device as set forth in claim 1 in which the driving means is connected to drive fixed pivot means at one end of said first arm; said follower means being at the other end of said first arm; one end of said second arm being connected to another fixed pivot means constituting the main output element and laterally spaced from said fixed pivot means.

3. A device as set forth in claim 2 in which the driving means includes a motor and a slip clutch interposed between said motor and said first arm.

4. A device as set forth in claim 2 also including another linkage comprising interconnected first and second links, said first link being connected at one end to said output element to be driven thereby, one end of said second link being mounted to a further fixed pivot means remote from said pivot means and said another pivot means.

5. A device as set forth in claim 4 in which there is a connecting means which interconnects the first and second links; and guide means for directing movement of said connecting means in an operating path displaced from arcuate paths about either said output element or said further pivot means as a center to change relative effective lengths of said first and second links in a predetermined relationship as the angular position of said output element changes.

6. A device as set forth in claim 5 in which the guide means includes a stationary cam means; and said connecting means includes a follower portion in operative engagement with the stationary cam means.

7. A device as set forth in claim 6 in which the connecting means also includes additional portions riding in first and second longitudinally extending slots in said first and second links.

8. A device as set forth in claim 7 in which the driving means includes a motor and a slip clutch interposed between said motor and said pivot means.

9. A device as set forth in claim 1 in which one of said first and second arms is mounted at one of its ends to a fixed pivot means and the other of said first and second arms is mounted at one of its ends to another fixed pivot means laterally spaced from said fixed pivot means; means connecting the driving means to drive said fixed pivot means; said another fixed pivot means constituting the main output element; said follower means being laterally spaced from both said fixed pivot means and said another fixed pivot means.

* * * * *